(12) United States Patent
Lauk et al.

(10) Patent No.: US 9,376,570 B2
(45) Date of Patent: Jun. 28, 2016

(54) DISPERSE AZO DYES, A PROCESS FOR THE PREPARATION THEREOF AND THE USE THEREOF

(71) Applicant: Huntsman International LLC, The Woodlands, TX (US)

(72) Inventors: Urs Lauk, Magstattle-Haut (FR); Patric Nowack, Steinen (DE); Ralf Petermann, Basel (CH); Romeo Dreier, Fehren (CH)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 14/413,583

(22) PCT Filed: Jun. 26, 2013

(86) PCT No.: PCT/EP2013/063346
§ 371 (c)(1),
(2) Date: Jan. 8, 2015

(87) PCT Pub. No.: WO2014/016072
PCT Pub. Date: Jan. 30, 2014

(65) Prior Publication Data
US 2015/0197637 A1    Jul. 16, 2015

(30) Foreign Application Priority Data

Jul. 27, 2012  (EP) .................................... 12178163

(51) Int. Cl.

| | | |
|---|---|---|
| C09B 67/00 | (2006.01) | |
| C09B 29/00 | (2006.01) | |
| C09B 29/036 | (2006.01) | |
| C09B 29/01 | (2006.01) | |
| C09B 29/033 | (2006.01) | |
| C09B 29/08 | (2006.01) | |
| C09B 43/42 | (2006.01) | |
| C09B 29/095 | (2006.01) | |
| C09B 29/42 | (2006.01) | |
| C09B 29/36 | (2006.01) | |
| D06P 3/52 | (2006.01) | |

(52) U.S. Cl.
CPC ......... *C09B 29/0033* (2013.01); *C09B 29/0003* (2013.01); *C09B 29/0007* (2013.01); *C09B 29/0048* (2013.01); *C09B 29/0085* (2013.01); *C09B 29/0805* (2013.01); *C09B 29/0809* (2013.01); *C09B 29/095* (2013.01); *C09B 29/3639* (2013.01); *C09B 29/3691* (2013.01); *C09B 43/42* (2013.01); *D06P 3/52* (2013.01); *D10B 2331/04* (2013.01)

(58) Field of Classification Search
CPC ............ C09B 29/0003; C09B 29/0033; C09B 29/0048; C09B 29/0809; C09B 29/095; C09B 29/3639; C09B 29/3691; C09B 2943/42; C09B 29/0805; D06P 3/52
USPC ................................................ 8/639; 534/765
See application file for complete search history.

(56) References Cited

U.S. PATENT DOCUMENTS

| 4,012,372 A | 3/1977 | Weaver et al. |
|---|---|---|
| 6,555,664 B1 * | 4/2003 | Lauk .................. C09B 29/0033 534/789 |

FOREIGN PATENT DOCUMENTS

| WO | 02/068539 | 9/2002 |
|---|---|---|
| WO | 2007/082803 | 7/2007 |
| WO | WO 2007/082803 A1 * | 7/2007 |
| WO | 2010/046192 | 4/2010 |

OTHER PUBLICATIONS

STIC Search Report dated Sep. 30, 2015.*

* cited by examiner

*Primary Examiner* — Eisa Elhilo

(57) ABSTRACT

The present invention relates to azo dyes of formula (1), wherein $R_1$ denotes $C_1$-$C_{12}$alkyl which is unsubstituted or substituted by one or more $C_1$-$C_{12}$alkoxy groups, hydroxyl groups, amino groups, cyano groups or halogen atoms and which may be interrupted one or more times by the radical —O—, —S—, —COO— or —OOC—: $R_4$ is hydrogen or $C_1$-$C_{12}$alkyl; either $R_2$ is cyano and $R_3$ is halogen or $R_2$ is halogen and $R_3$ is cyano; and Ar represents a carbocyclic or heterocyclic aromatic radical, to the process for the preparation thereof, to mixtures containing said dyes and to the use thereof in dyeing or printing semi-synthetic and especially synthetic hydrophobic fiber materials, more especially textile materials.

(1)

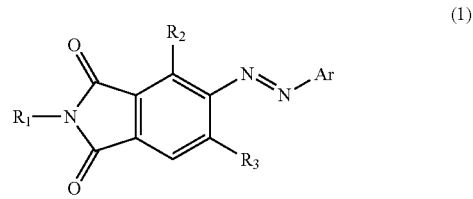

11 Claims, No Drawings

DISPERSE AZO DYES, A PROCESS FOR THE PREPARATION THEREOF AND THE USE THEREOF

CROSS REFERENCE TO RELATED APPLICATIONS

This application is the National Phase of International Application PCT/EP2013/063346 filed Jun. 26, 2013 which designated the U.S. and which claims priority to European Pat. App. No. 12178163.7 filed Jul. 27, 2012. The noted applications are incorporated herein by reference.

The present invention relates to disperse azo dyes based on aminophthalimides as the diazotizing component, a process for the preparation of such dyes and to the use thereof in dyeing or printing semi-synthetic and especially synthetic hydrophobic fibre materials, more especially textile materials.

Azo dyes based on aminophthalimides as the diazotizing component are known, for example, from U.S. Pat. No. 3,980,634. It has, however, been found that the dyeings or prints obtained using the currently known dyes do not in all cases satisfy today's requirements, especially in respect of light fastness and fastness to washing. There is therefore a need for new dyes that especially have good washing fastness properties.

Surprisingly, we found that azo dyes based on specific halogen- and cyanosubstituted phthalimides show very good light fastness and excellent washing fastness results.

The present invention relates to dyes of formula

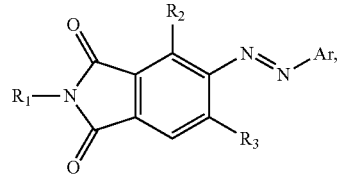

(1)

wherein $R_1$ denotes $C_1$-$C_{12}$alkyl which is unsubstituted or substituted by one or more $C_1$-$C_{12}$alkoxy groups, $C_1$-$C_{12}$alkylcarbonyl groups, $C_7$-$C_{25}$arylcarbonyl groups, hydroxyl groups, amino groups, cyano groups or halogen atoms and which may be interrupted one or more times by the radical —O—, —S—, —$NR_4$—, —COO— or —OOC—;

$R_4$ is hydrogen or $C_1$-$C_{12}$alkyl;

either $R_2$ is cyano and $R_3$ is halogen or $R_2$ is halogen and $R_3$ is cyano; and Ar represents a carbocyclic or heterocyclic aromatic radical.

Any radical denoting alkyl may be a straight-chain or branched alkyl radical.

Examples of alkyl groups include methyl, ethyl, n-propyl, isopropyl, n-butyl, isobutyl, sec-butyl, tert-butyl, n-pentyl, isopentyl, neopentyl, n-hexyl, n-octyl, i-octyl, n-decyl and n-dodecyl.

$C_1$-$C_{12}$ alkoxy may be, for example, methoxy, ethoxy, n-propoxy, isopropoxy, n-butoxy, iso-butoxy, sec-butoxy, tert-butoxy, n-pentoxy, neopentoxy, n-hexoxy, n-octoxy, i-octoxy, n-decoxy or n-dodecoxy.

Any radical denoting halogen may be fluorine, chlorine or bromine, in particular chlorine or bromine.

Carbocyclic or heterocyclic aromatic coupling components Ar—H for the preparation of azo dyes are well-known to the person skilled in the art.

Suitable radicals Ar are radicals of the coupling components of the benzene, naphthalene, pyrazolone, thiophene, thiazole, quinoline or 6-hydroxypyridone-(2) series.

Preference is given to azo dyes of formula (1), wherein $R_1$ denotes unsubstituted $C_1$-$C_{12}$alkyl.

Azo dyes of formula (1), wherein $R_1$ denotes methyl, ethyl, n-propyl, i-propyl or n-butyl, are particularly preferred In the most preferred azo dyes of formula (1) $R_1$ is ethyl.

Ar is preferably a radical of the formula

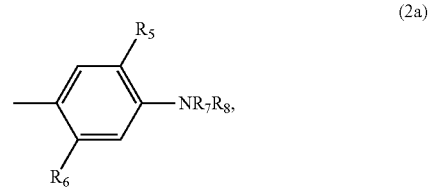

(2a)

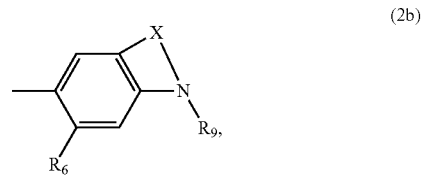

(2b)

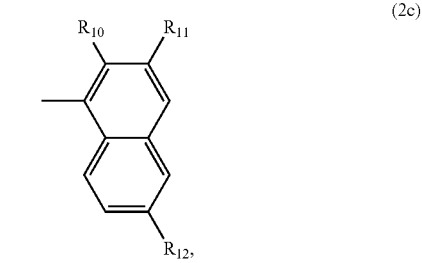

(2c)

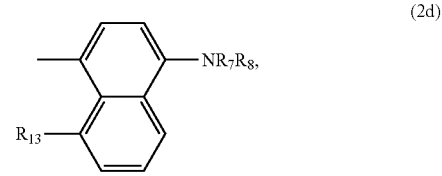

(2d)

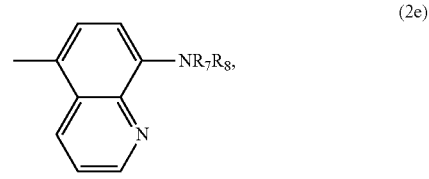

(2e)

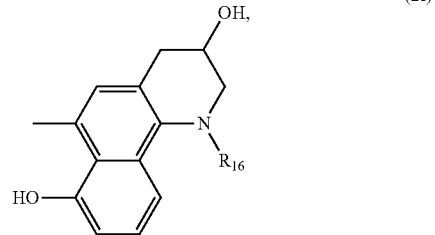

(2f)

-continued

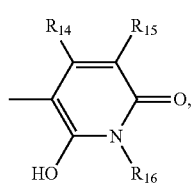
(2g)

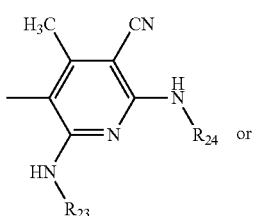
(2h)

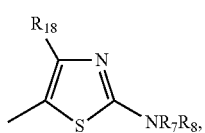
(2i)

wherein $R_5$ denotes hydrogen, chloro, methyl, methoxy, 2-hydroxyethyl or —$COOR_{19}$, wherein $R_{19}$ has one of the meanings given for $R_1$ above;

$R_6$ is hydrogen, hydroxy, chloro, trifluoromethyl, —$OR_{20}$, —$OCH_2COOR_{20}$, —NH—CO—$R_{20}$ or —NH—$SO_2$—$R_{20}$, wherein $R_{20}$ has one of the meanings given for $R_1$ above;

$R_7$ and $R_8$ have each independently of the other one of the meanings given for $R_1$ above;

X denotes ethylene, trimethylene or oxyethylene;

$R_9$ is vinyl, allyl, benzyl or has one of the meanings given for $R_1$ above;

$R_{10}$ is hydroxy or phenylamino;

$R_{11}$ is hydrogen, —$COOR_{21}$ or $C_6$-$C_{24}$aryl that is unsubstituted or or substituted by one or more $C_1$-$C_{12}$alkyl groups, $C_1$-$C_{12}$alkoxy groups, hydroxyl groups, amino groups, cyano groups or halogen atoms;

$R_{21}$ has one of the meanings given for $R_1$ above;

$R_{12}$ is hydrogen or —$SO_2$—$NHR_{22}$, wherein $R_{22}$ has one of the meanings given for $R_1$ above;

$R_{13}$ is hydrogen or hydroxy;

$R_{14}$ denotes $C_1$-$C_{12}$alkyl or trifluoromethyl:

$R_{15}$ is cyano or —$CONH_2$;

$R_{16}$ has one of the meanings given for $R_1$ above;

$R_{23}$ and $R_{24}$ are each independently of the other hydrogen, vinyl, allyl or $C_1$-$C_6$ alkyl which is unsubstituted or substituted by cyano, carboxy, hydroxy, $C_1$-$C_{12}$alkoxy-, $C_2$-$C_8$alkoxyalkoxy- or $C_6$-$C_{24}$aryl; and $R_{18}$ is hydrogen, $C_1$-$C_{12}$alkyl, $C_1$-$C_{12}$alkoxy or $C_6$-$C_{24}$aryl that is unsubstituted or or substituted by one or more $C_1$-$C_{12}$alkyl groups, $C_1$-$C_{12}$alkoxy groups, hydroxyl groups, amino groups, cyano groups or halogen atoms.

Particularly preferred are dyes of formula (1) as defined above, wherein Ar is a radical of formula (2a).

Further preference is given to azo dyes of formula (1), wherein Ar is a radical of the formula (2a) wherein $R_6$ is —NH—CO—$R_{20}$ and $R_{20}$ is as defined above.

In the formula (2a) $R_7$ and $R_8$ each independently of the other preferably denote methyl, ethyl, n-propyl, n-butyl, allyl, benzyl, 4-nitrobenzyl, 4-methoxybenzyl, 3-methoxybenzyl, 2-hydroxyethyl, 2-acetoxyethyl, 2-cyanoethyl, 2-methoxyethyl, 2-phenylethyl, 1-methoxycarbonylethyl, 2-methoxycarbonylethyl, methoxycarbonylmethyl, 1-ethoxycarbonylethyl, 2-ethoxycarbonylethyl, ethoxycarbonylmethyl, 2-hydroxy-3-phenoxypropyl, 2-hydroxy-3-i-propoxypropyl or a radical of the formulae

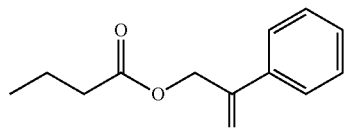
,

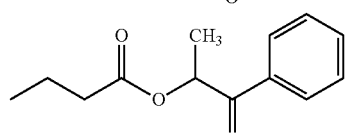
,

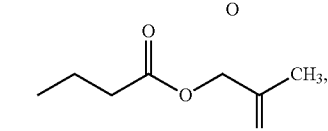
,

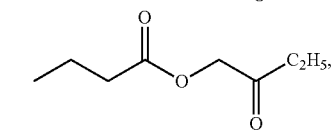
,

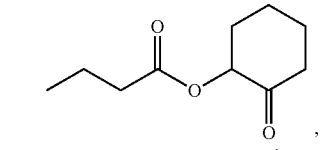
,

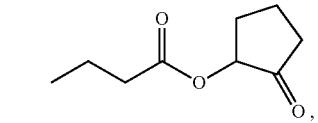
,

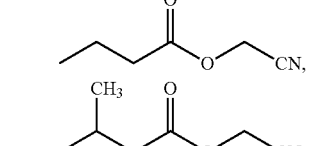
,

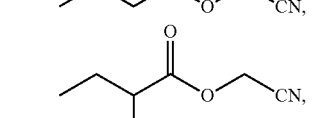
,

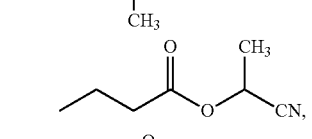
,

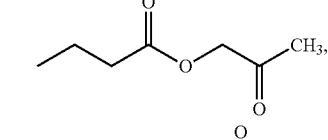
,

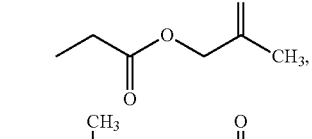
,

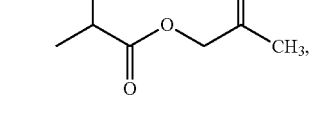

-continued

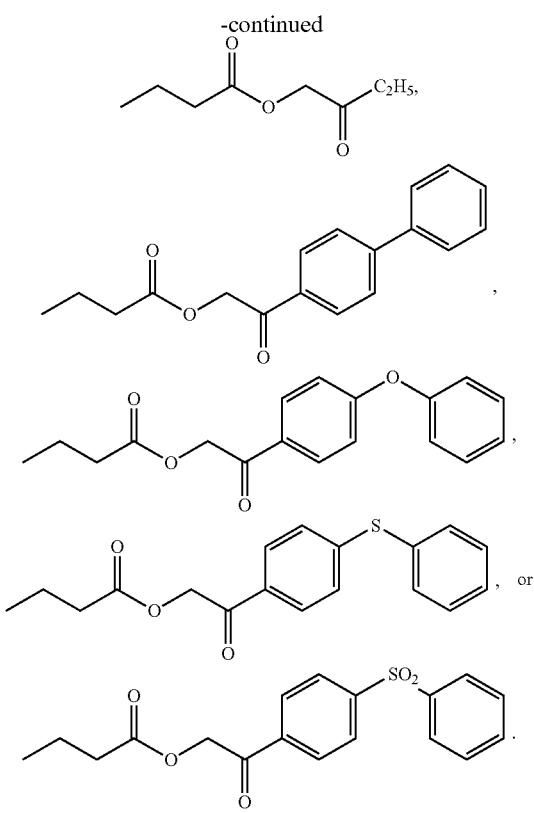

Moreover, preference is given to azo dyes of formula (1), wherein Ar is a radical of the formula (2a) wherein $R_5$ is hydrogen, methyl or methoxy.

The present invention also relates to a process for the preparation of an azo dye of formula (1) according to claim 1, which comprises reacting an azo dye of the formula

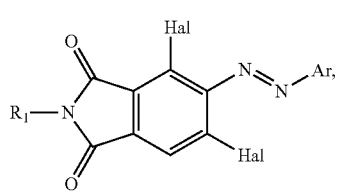

(3)

wherein $R_1$ and Ar are as defined above and Hal represents halogen,
with a mixture of at least one alkali metal cyanide and at least one heavy metal cyanide, wherein a total amount of 0.30 mol-1.25 mol of cyanide is applied per mol of dye of formula (3).

The dyes of formula (3) are known, for example from U.S. Pat. No. 3,980,634, or can be prepared according to known methods.

The halogen/cyano exchange of dibromo compounds which leads to the claimed dyes of formula (1) is likewise known per se, for instance from WO 2002/068539.

Unexpectedly, the application of a mixture of an alkali metal cyanide and a heavy metal cyanide allows the limitation of the reaction to the partial cyano replacement; i.e. only minor amounts of dicyano compounds are generated.

The reaction is preferably carried out in aprotic polar solvents, like DMF, DMAc, NMP, NEP, DMSO, tetramethylurea, sulfolane, HMPT, pyridine and pyridine derivatives, as well as in mixtures of two or more aprotic polar solvents.

The cyanation agent is a mixture of at least one alkali metal cyanide, like NaCN or KCN, and at least one heavy metal cyanide, like CuCN. The molar ratio alkali cyanide/heavy metal cyanide is preferably from 1:20 to 1:1, in particular from 1:15 to 1:5.

The cyanide mixture is purposively applied in such an amount that the total content of cyanide is from 0.25-1.25 mol, preferably from 0.4-1.0 mol, per mol of dye of formula (3).

Depending on the reactivity of dihalogen compound (3), the reaction temperature may vary within wide ranges. Preferably, the reaction is carried out at temperatures from 0° C. to 150° C., more preferably from RT to 130° C. and in particular from RT to 60° C.

The reaction product obtained by the reaction of the dye of formula (3) with the cyanide mixture contains the dye of the formula (1a) as main product and, depending on the reaction conditions (solvent, reaction time, temperature, ratio of educts), minor amounts of the isomeric dye of the formula (1b) as well as the educt of formula (3) and the dicyano compound of formula (4)

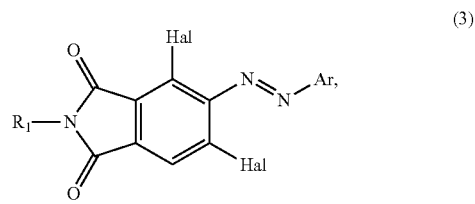

(3)

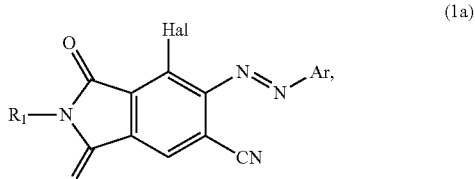

(1a)

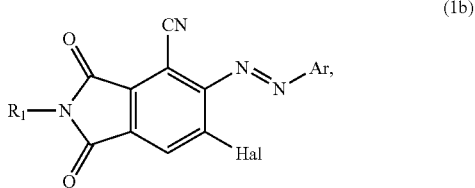

(1b)

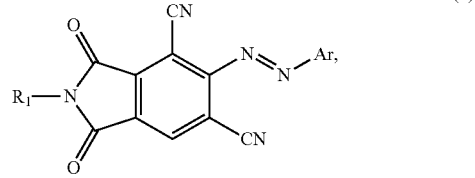

(4)

With respect to the dyestuff application on textile fibres it is not necessary to separate the main product (1a) from the other dyes, because the dye mixture obtained as raw product likewise has very good build-up properties and provides dyeings on polyester exhibiting high fibre-levelness and surface-levelness.

Therefore, the invention also relates to a mixture comprising an azo dye of the formula an azo dye of the formula

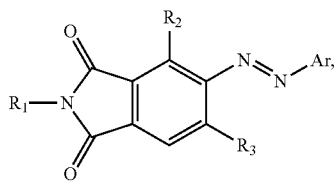
(1)

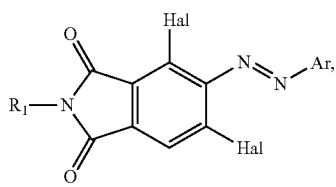
(3)

and
an azo dye of the formula

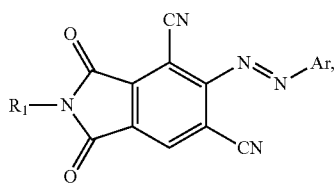
(4)

wherein $R_1$ and Ar are as defined in claim 1 and Hal represents halogen, especially bromo.

For the adjustment of specic shades it is advisable to combine two or more different dyestuffs of the formula (1).

The invention therefore further relates to a dye mixture comprising
(A) 10-90% by weight, preferably 20-80% by weight, of a dye of the formula (1) as defined above, and
(B) 10-90% by weight, preferably 20-80% by weight, of a dye of the formula (1) as defined above which is structurally different from the dye according to component (A).

The azo dyes and dye mixtures according to the invention can also be used satisfactorily in the preparation of mixed shades together with other dyes.

Further suitable dyes which can advantageously be mixed with the dyes of formula (1) according to the invention are, for example, C.I. Disperse Violet 107, C.I. Disperse Blue 60, C.I. Disperse Blue 284, C.I. Disperse Blue 295, C.I. Disperse Blue 337, C.I. Disperse Blue 354, C.I. Disperse Blue 365, C.I. Disperse Blue 368, C.I. Disperse Blue 378, C.I. Disperse Blue 380 as well as the blue dyestuffs disclosed in WO 2009/013122.

The azo dyes and dye mixtures according to the invention can be used especially as a suitable component in a dichromatic or trichromatic dyeing or printing technique.

The invention therefore further relates to a dichromatic or trichromatic dye mixture comprising at least one azo dye of formula (1) according to claim 1 and at least one further disperse dye.

The dyes and dye mixtures according to the invention may be used for dyeing or printing semi-synthetic and especially synthetic hydrophobic fibre materials, more especially textile materials. Textile materials composed of blend fabrics that comprise such semi-synthetic or synthetic hydrophobic fibre materials can also be dyed or printed using the dyes according to the invention.

Semi-synthetic fibre materials that come into consideration are, especially, cellulose 2½-acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride or on polyamide.

The application of the dyes and dye mixtures according to the invention to the fibre materials is effected in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2½-acetate is dyed preferably at from 65 to 85° C. and cellulose triacetate at temperatures of from 65 to 115° C.

The dyes and dye mixtures according to the invention will not colour wool and cotton present at the same time in the dyebath or will colour such materials only slightly (very good reservation) so that they can also be used satisfactorily in the dyeing of polyester/wool and polyester/cellulosic fibre blend fabrics.

The dyes and dye mixtures according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes and dye mixtures according to the invention into a dye preparation prior to use. For this purpose, the dye is ground so that its particle size is on average from 0.1 to 10 microns. Grinding can be carried out in the presence of dispersants. For example, the dried dye is ground together with a dispersant or kneaded into a paste form together with a dispersant and then dried in vacuo or by atomisation. After adding water, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by mixing together the individual components, if necessary in combination with suitable dispersing agents, in the desired amount of water.

The dyes and dye mixtures according to the invention impart to the said materials, especially to polyester materials, level colour shades having very good in-use fastness properties such as, especially, good fastness to light, fastness to heat setting, fastness to pleating, fastness to chlorine, and wet fastness, e.g. fastness to water, to perspiration and to washing; the finished dyeings are further characterised by very good fastness to rubbing. Special emphasis should be given to the good fastness properties of the dyeings obtained with respect to perspiration and, especially, to washing.

Furthermore, the dyes and dye mixtures according to the invention are also well suited to dyeing hydrophobic fibre materials from supercritical $CO_2$.

The present invention relates to the above-mentioned use of the dyes according to the invention as well as to a process for the dyeing or printing of semi-synthetic or synthetic hydrophobic fibre materials, especially textile materials, in which process a dye according to the invention is applied to the said materials or incorporated into them. The said hydrophobic fibre materials are preferably textile polyester materials. Further substrates that can be treated by the process according to the invention and preferred process conditions can be found hereinbefore in the more detailed description of the use of the dyes according to the invention.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The invention relates also to hydrophobic fibre materials, preferably polyester textile materials, dyed or printed by the said process.

The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimeters.

I. PREPARATION EXAMPLES

I.1 Dyestuff of Formula (101)

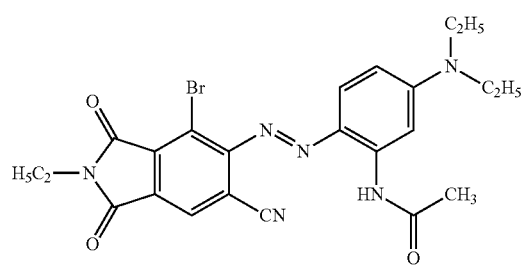

(101)

8.48 g (0.015 mol) of the dye of formula (101a)

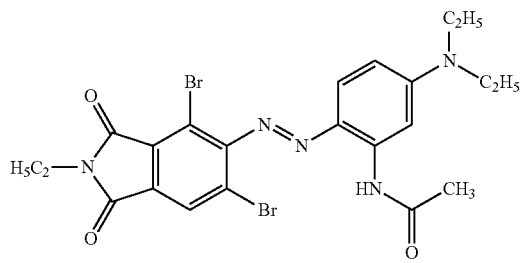

(101a)

which was prepared as described in U.S. Pat. No. 3,980,634 are dissolved under stirring at RT (room temperature) in 120 ml of pyridine. 0.147 g (0.003 mol) finely powdered NaCN and 1.343 g (0.003 mol) finely powdered CuCN are given to 100 ml pyridine and suspended under vigorous stirring. The suspension so obtained is within 4 h slowly dropped to the solution of the dye of formula (201) at RT. The reaction mixture is stirred over night and then diluted with 150 ml pyridine. The blue precipitate is filtered off and washed with water; after drying 2 g of crude product is obtained.

According to HPLC analysis, the raw product essentially consists of a mixture of three different dyestuffs namely about 30% of educt (201), 50% of the dyestuff of formula (101) and 20% of the dicyano compound of formula (202) which are separated by conventional chromatographic methods.

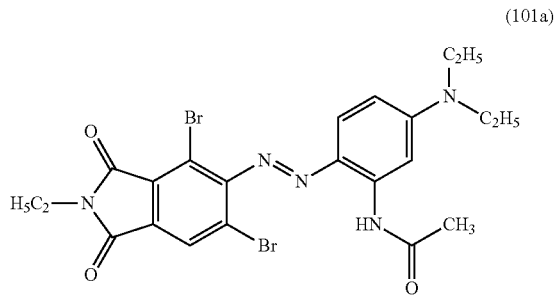

(101a)

m.p. (melting point)=156-158° C.
$\lambda_{max}$=472 nm ($\lambda_{max}$=wavelength of the absorption maximum)
Elemental Analysi:

|   | in theory | found |
|---|---|---|
| C | 46.70% | 46.65% |
| H | 4.10% | 4.15% |
| N | 12.39% | 12.30% |
| Br | 28.27% | 28.05% |

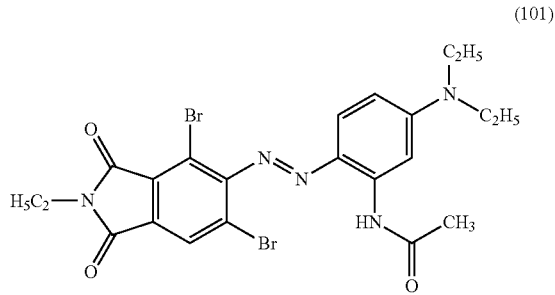

(101)

m.p.=204-208° C.
$\lambda_{max}$=586 nm

Elemental Analysis:

|   | in theory | found |
|---|---|---|
| C | 54.02% | 53.87% |
| H | 4.53% | 4.80% |
| N | 15.63% | 19.12% |
| Br | 18.44% | 16.90% |

$^1$H-NMR (DMSO-$d_6$, 250 MHz): δ=9.39 (s, broad, —NH), 8.17 (s, broad, 1H), 8.06 (d, broad, J=2.0, 1H), 8.03 (s, 1H), 6.53 (d, broad, J=4.0, 1H), 3.79 (q, J=3.0, 2H), 3.57 (q, J=3.0, 4H), 2.22 (s, 3H), 1.23-1.35 (m, 9H).

(101b)

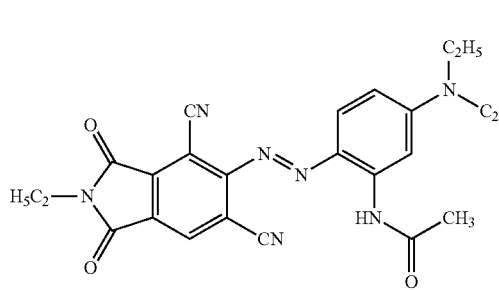

m.p.=128-131° C.

$\lambda_{max}$=608 nm

Elemental Analysis:

|   | in theory | found |
|---|---|---|
| C | 63.00% | 62.80% |
| H | 5.07% | 5.20% |
| N | 21.44% | 22.60% |
| Br | 0.00% | 0.10% |

The dyes of formulae (102)-(457) listed in the following Tables 1 and 2 can be prepared in analogy to the method described above.

TABLE 1

Dyestuffs of formula (1a)

(1a)

| Dye | $R_1$ | $R_5$ | $R_6$ | $R_7$ | $R_8$ | $\lambda_{max}$/nm |
|---|---|---|---|---|---|---|
| 102 | ethyl | H | acetylamino | ethyl | methyl | 582 |
| 103 | ethyl | H | acetylamino | ethyl | n-propyl | 588 |
| 104 | ethyl | H | acetylamino | ethyl | benzyl | 574 |
| 105 | ethyl | H | acetylamino | ethyl | n-butyl | 590 |
| 106 | ethyl | H | acetylamino | 2-methoxyethyl | 2-methoxyethyl | 579 |
| 107 | ethyl | H | acetylamino | ethyl | 2-methoxyethyl | 583 |
| 108 | ethyl | H | acetylamino | ethyl | 2-cyanoethyl | 568 |
| 109 | ethyl | H | acetylamino | 2-methoxyethyl | benzyl | 568 |
| 110 | ethyl | H | methyl | ethyl | benzyl | 542 |
| 111 | ethyl | OCH$_3$ | acetylamino | ethyl | 2-cyanoethyl | 601 |
| 112 | ethyl | H | acetylamino | ethyl | 2-phenylethyl | 583 |
| 113 | ethyl | H | acetylamino | n-propyl | n-propyl | 587 |
| 114 | ethyl | H | propionylamino | ethyl | benzyl | 575 |
| 115 | ethyl | H | H | ethyl | 2-cyanoethyl | 511 |
| 116 | ethyl | H | acetylamino | 2-cyanoethyl | benzyl | 549 |
| 117 | ethyl | OCH$_3$ | acetylamino | 2-cyanoethyl | benzyl | 589 |
| 118 | ethyl | H | H | 2-cyanoethyl | 2-cyanoethyl | 482 |
| 119 | ethyl | OCH$_3$ | acetylamino | 2-acetoxyethyl | benzyl | 601 |
| 120 | ethyl | H | H | 2-cyanoethyl | benzyl | 495 |
| 121 | ethyl | H | acetylamino | 1-methoxycarbonylethyl | methoxycarbonylmethyl | 531 |
| 122 | ethyl | OCH$_3$ | acetylamino | 1-methoxycarbonylethyl | methoxycarbonylmethyl | 577 |
| 123 | ethyl | OCH$_3$ | acetylamino | 2-methoxyethyl | 2-methoxyethyl | 601 |
| 124 | ethyl | H | acetylamino | methoxycarbonylmethyl | methoxycarbonylmethyl | 531 |
| 125 | ethyl | OCH$_3$ | acetylamino | methoxycarbonylmethyl | benzyl | 595 |
| 126 | Ethyl | H | acetylamino | ethyl | ethoxycarbonylmethyl | 563 |
| 127 | Ethyl | H | acetylamino | ethyl | 2-methoxycarbonylethyl | 577 |
| 128 | Ethyl | H | acetylamino | ethyl | 2-acetoxyethyl | 575 |
| 129 | Ethyl | H | acetylamino | ethyl | 2-hydroxy-3-phenoxypropyl | 582 |
| 130 | Ethyl | H | acetylamino | allyl | allyl | 571 |
| 131 | Ethyl | H | acetylamino | ethyl | 2-ethoxycarbonylethyl | 577 |
| 132 | Ethyl | H | acetylamino | ethyl | 2-hydroxy-3-isopropoxypropyl | 584 |

TABLE 1-continued

Dyestuffs of formula (1a)

(1a)

| Dye | $R_1$ | $R_5$ | $R_6$ | $R_7$ | $R_8$ | $\lambda_{max}$/nm |
|---|---|---|---|---|---|---|
| 133 | Ethyl | H | methyl | 2-methoxyethyl | 2-methoxyethyl | 545 |
| 134 | Ethyl | H | methyl | ethyl | 2-methoxyethyl | 555 |
| 135 | Ethyl | H | H | 2-methoxyethyl | 2-methoxyethyl | 525 |
| 136 | Ethyl | H | trifluoromethyl | 2-methoxyethyl | 2-methoxyethyl | 487 |
| 137 | Ethyl | H | chloro | 2-methoxyethyl | 2-methoxyethyl | 513 |
| 138 | Ethyl | Cl | acetylamino | H | 1-methoxycarbonylethyl | 527 |
| 139 | Ethyl | Cl | acetylamino | H | 1-phenylethyl | 541 |
| 140 | Ethyl | H | H | ethyl | 1-methoxycarbonylethyl | 505 |
| 141 | Ethyl | H | H | ethyl | 2-methoxycarbonylethyl | 527 |
| 142 | Ethyl | H | H | ethyl | methoxycarbonylmethyl | 505 |
| 143 | Ethyl | H | acetylamino | 2-methoxycarbonylethyl | 2-ethoxycarbonylethyl | 531 |
| 144 | Ethyl | $CH_3$ | acetylamino | ethyl | 1-methoxycarbonylethyl | 535 |
| 145 | ethyl | H | methyl | 2-methoxyethyl | 2-methoxycarbonylethyl | 538 |
| 146 | ethyl | H | methyl | ethyl | 1-methoxycarbonylethyl | 526 |
| 147 | ethyl | $OCH_3$ | acetylamino | 2-methoxycarbonylethyl | 2-methoxycarbonylethyl | 604 |
| 148 | ethyl | H | methyl | ethyl | 1-ethoxycarbonylethyl | 528 |
| 149 | ethyl | H | H | ethyl | 1-ethoxycarbonylethyl | 512 |
| 150 | ethyl | H | methoxycarbonyl | 2-methoxyethyl | 2-methoxyethyl | 518 |
| 151 | ethyl | $OCH_3$ | acetylamino | 2-acetoxyethyl | 2-acetoxyethyl | 600 |
| 152 | ethyl | $OCH_3$ | acetylamino | benzyl | 1-methoxycarbonylethyl | 586 |
| 153 | ethyl | $OCH_3$ | acetylamino | methoxycarbonylmethyl | methoxycarbonylmethyl | 576 |
| 154 | ethyl | H | acetylamino | ethyl | 1-methoxycarbonylethyl | 564 |
| 155 | ethyl | H | acetylamino | ethyl | 1-ethoxycarbonylethyl | 566 |
| 156 | ethyl | H | cyano | 2-methoxyethyl | 2-methoxyethyl | 504 |
| 157 | ethyl | H | acetylamino | H | 1-methoxycarbonylethyl | 546 |
| 158 | ethyl | H | methyl | ethyl | 2-methoxycarbonylethyl | 546 |
| 159 | ethyl | $OCH_3$ | acetylamino | H | 1-methoxycarbonylethyl | 592 |
| 160 | ethyl | H | methyl | 2-cyanoethyl | 2-methoxycarbonylethyl | 512 |
| 161 | ethyl | H | H | 2-cyanoethyl | 2-methoxycarbonylethyl | 496 |
| 162 | ethyl | H | acetylamino | 2-cyanoethyl | 2-methoxycarbonylethyl | 550 |
| 163 | ethyl | H | acetylamino | benzyl | 2-methoxycarbonylethyl | 564 |
| 164 | ethyl | H | acetylamino | 2-methoxycarbonylethyl | 2-methoxycarbonylethyl | 562 |
| 165 | ethyl | H | acetylamino | ethyl | 4-nitrobenzyl | 566 |
| 166 | ethyl | $OCH_3$ | acetylamino | ethyl | 4-nitrobenzyl | 612 |
| 167 | ethyl | H | acetylamino | n-butyl | n-butyl | 588 |
| 168 | ethyl | H | acetylamino | ethyl | 4-methoxybenzyl | 578 |
| 169 | ethyl | H | acetylamino | ethyl | 3-methoxybenzyl | 579 |
| 170 | ethyl | $CH_3$ | acetylamino | ethyl | benzyl | 556 |
| 171 | ethyl | H | acetylamino | n-butyl | benzyl | 579 |
| 172 | ethyl | $CH_3$ | acetylamino | ethyl | 2-hydroxy-3-phenoxypropyl | 568 |
| 173 | ethyl | $CH_3$ | acetylamino | ethyl | 2-hydroxy-3-isopropoxypropyl | 568 |
| 174 | ethyl | H | acetylamino | ethyl | n-butyl | 586 |
| 175 | ethyl | $CH_3$ | acetylamino | ethyl | 2-phenylethyl | 572 |
| 176 | ethyl | $OCH_3$ | acetylamino | allyl | allyl | 618 |
| 177 | ethyl | H | acetylamino | ethyl | 3-phenoxypropyl | 584 |
| 178 | ethyl | H | acetylamino | ethyl | n-propyl | 586 |
| 179 | ethyl | H | acetylamino | ethyl | 4-acetoxybutyl | 586 |
| 180 | methyl | H | acetylamino | ethyl | ethyl | 585 |
| 181 | methyl | H | acetylamino | ethyl | methyl | 582 |
| 182 | methyl | H | acetylamino | ethyl | n-propyl | 580 |
| 183 | methyl | H | acetylamino | ethyl | benzyl | 574 |
| 184 | methyl | H | acetylamino | ethyl | n-butyl | 590 |
| 185 | methyl | H | acetylamino | 2-methoxyethyl | 2-methoxyethyl | 579 |
| 186 | methyl | H | acetylamino | ethyl | 2-methoxyethyl | 583 |
| 187 | methyl | H | acetylamino | ethyl | 2-cyanoethyl | 568 |
| 188 | methyl | H | acetylamino | 2-methoxyethyl | benzyl | 568 |
| 189 | methyl | H | methyl | ethyl | benzyl | 544 |
| 190 | methyl | $OCH_3$ | acetylamino | ethyl | 2-cyanoethyl | 601 |
| 191 | methyl | H | acetylamino | ethyl | 2-phenylethyl | 583 |
| 192 | methyl | H | acetylamino | n-propyl | n-propyl | 587 |
| 193 | methyl | H | propionylamino | ethyl | benzyl | 575 |
| 194 | methyl | H | H | ethyl | 2-cyanoethyl | 511 |

TABLE 1-continued

Dyestuffs of formula (1a)

(1a)

[Structure: phthalimide with R₁ on N, Br and azo linkage, CN group; azo connects to phenyl ring bearing R₅, R₆, and N(R₇)(R₈)]

| Dye | R₁ | R₅ | R₆ | R₇ | R₈ | λ$_{max}$/nm |
|---|---|---|---|---|---|---|
| 195 | methyl | H | acetylamino | 2-cyanoethyl | benzyl | 549 |
| 196 | methyl | OCH₃ | acetylamino | 2-cyanoethyl | benzyl | 583 |
| 197 | methyl | H | H | 2-cyanoethyl | 2-cyanoethyl | 482 |
| 198 | methyl | OCH₃ | acetylamino | 2-acetoxyethyl | benzyl | 601 |
| 199 | methyl | H | H | 2-cyanoethyl | benzyl | 495 |
| 200 | methyl | H | acetylamino | 1-methoxycarbonylethyl | methoxycarbonylmethyl | 531 |
| 201 | methyl | OCH₃ | acetylamino | 1-methoxycarbonylethyl | methoxycarbonylmethyl | 577 |
| 202 | methyl | OCH₃ | acetylamino | 2-methoxyethyl | 2-methoxyethyl | 601 |
| 203 | methyl | H | acetylamino | methoxycarbonylmethyl | methoxycarbonylmethyl | 531 |
| 204 | methyl | OCH₃ | acetylamino | methoxycarbonylmethyl | benzyl | 595 |
| 205 | methyl | H | acetylamino | ethyl | ethoxycarbonylmethyl | 563 |
| 206 | methyl | H | acetylamino | ethyl | 2-methoxycarbonylethyl | 577 |
| 207 | methyl | H | acetylamino | ethyl | 2-acetoxyethyl | 575 |
| 208 | methyl | H | acetylamino | ethyl | 2-hydroxy-3-phenoxypropyl | 562 |
| 209 | methyl | H | acetylamino | allyl | allyl | 571 |
| 210 | methyl | H | acetylamino | ethyl | 2-ethoxycarbonylethyl | 577 |
| 211 | methyl | H | acetylamino | ethyl | 2-hydroxy-3-isopropoxypropyl | 584 |
| 212 | methyl | H | methyl | 2-methoxyethyl | 2-methoxyethyl | 545 |
| 213 | methyl | H | methyl | ethyl | 2-methoxyethyl | 555 |
| 214 | methyl | H | H | 2-methoxyethyl | 2-methoxyethyl | 525 |
| 215 | methyl | H | trifluoromethyl | 2-methoxyethyl | 2-methoxyethyl | 487 |
| 216 | methyl | H | chloro | 2-methoxyethyl | 2-methoxyethyl | 513 |
| 217 | methyl | Cl | acetylamino | H | 1-methoxycarbonylethyl | 527 |
| 218 | methyl | Cl | acetylamino | H | 1-phenylethyl | 541 |
| 219 | methyl | H | H | ethyl | 1-methoxycarbonylethyl | 506 |
| 220 | methyl | H | H | ethyl | 2-methoxycarbonylethyl | 527 |
| 221 | methyl | H | H | ethyl | methoxycarbonylmethyl | 505 |
| 222 | methyl | H | acetylamino | 2-methoxycarbonylethyl | 2-ethoxycarbonylethyl | 530 |
| 223 | methyl | CH₃ | acetylamino | ethyl | 1-methoxycarbonylethyl | 535 |
| 224 | methyl | H | methyl | 2-methoxyethyl | 2-methoxycarbonylethyl | 537 |
| 225 | methyl | H | methyl | ethyl | 1-methoxycarbonylethyl | 526 |
| 226 | methyl | OCH₃ | acetylamino | 2-methoxycarbonylethyl | 2-methoxycarbonylethyl | 602 |
| 227 | methyl | H | methyl | ethyl | 1-ethoxycarbonylethyl | 528 |
| 228 | methyl | H | H | ethyl | 1-ethoxycarbonylethyl | 512 |
| 229 | methyl | H | methoxycarbonyl | 2-methoxyethyl | 2-methoxyethyl | 518 |
| 230 | methyl | OCH₃ | acetylamino | 2-acetoxyethyl | 2-acetoxyethyl | 599 |
| 231 | methyl | OCH₃ | acetylamino | benzyl | 1-methoxycarbonylethyl | 586 |
| 232 | methyl | OCH₃ | acetylamino | methoxycarbonylmethyl | methoxycarbonylmethyl | 576 |
| 233 | methyl | H | acetylamino | ethyl | 1-methoxycarbonylethyl | 564 |
| 234 | methyl | H | acetylamino | ethyl | 1-ethoxycarbonylethyl | 564 |
| 235 | methyl | H | cyano | 2-methoxyethyl | 2-methoxyethyl | 503 |
| 236 | methyl | H | acetylamino | H | 1-methoxycarbonylethyl | 545 |
| 237 | methyl | H | methyl | ethyl | 2-methoxycarbonylethyl | 545 |
| 238 | methyl | OCH₃ | acetylamino | H | 1-methoxycarbonylethyl | 592 |
| 239 | methyl | H | methyl | 2-cyanoethyl | 2-methoxycarbonylethyl | 512 |
| 240 | methyl | H | H | 2-cyanoethyl | 2-methoxycarbonylethyl | 495 |
| 241 | methyl | H | acetylamino | 2-cyanoethyl | 2-methoxycarbonylethyl | 550 |
| 242 | methyl | H | acetylamino | benzyl | 2-methoxycarbonylethyl | 562 |
| 243 | methyl | H | acetylamino | 2-methoxycarbonylethyl | 2-methoxycarbonylethyl | 563 |
| 244 | methyl | H | acetylamino | ethyl | 4-nitrobenzyl | 566 |
| 245 | methyl | H | acetylamino | n-butyl | n-butyl | 588 |
| 246 | methyl | H | acetylamino | ethyl | 4-methoxybenzyl | 578 |
| 247 | methyl | H | acetylamino | ethyl | 3-methoxybenzyl | 579 |
| 248 | methyl | CH₃ | acetylamino | ethyl | benzyl | 556 |
| 249 | methyl | H | acetylamino | n-butyl | benzyl | 583 |
| 250 | methyl | CH₃ | acetylamino | ethyl | 2-hydroxy-3-phenoxypropyl | 568 |
| 251 | methyl | CH₃ | acetylamino | ethyl | 2-hydroxy-3-isopropoxypropyl | 584 |
| 252 | methyl | H | acetylamino | ethyl | n-butyl | 585 |
| 253 | methyl | CH₃ | acetylamino | ethyl | 2-phenylethyl | 572 |
| 254 | methyl | OCH₃ | acetylamino | allyl | allyl | 620 |
| 255 | methyl | H | acetylamino | ethyl | 3-phenoxypropyl | 584 |
| 256 | methyl | H | acetylamino | ethyl | n-propyl | 585 |

TABLE 1-continued

Dyestuffs of formula (1a)

(1a)

| Dye | R$_1$ | R$_5$ | R$_6$ | R$_7$ | R$_8$ | $\lambda_{max}$/nm |
|---|---|---|---|---|---|---|
| 257 | methyl | H | acetylamino | ethyl | 4-acetoxybutyl | 586 |
| 258 | n-propyl | H | acetylamino | ethyl | ethyl | 587 |
| 259 | n-propyl | H | acetylamino | ethyl | methyl | 584 |
| 260 | n-propyl | H | acetylamino | ethyl | n-propyl | 588 |
| 261 | n-propyl | H | acetylamino | ethyl | benzyl | 575 |
| 262 | n-propyl | H | acetylamino | ethyl | n-butyl | 591 |
| 263 | n-propyl | H | acetylamino | 2-methoxyethyl | 2-methoxyethyl | 575 |
| 264 | n-propyl | H | acetylamino | ethyl | 2-methoxyethyl | 581 |
| 265 | n-propyl | H | acetylamino | ethyl | 2-cyanoethyl | 570 |
| 266 | n-propyl | H | acetylamino | 2-methoxyethyl | benzyl | 543 |
| 267 | n-propyl | H | methyl | ethyl | benzyl | 602 |
| 268 | n-propyl | OCH$_3$ | acetylamino | ethyl | 2-cyanoethyl | 583 |
| 269 | n-propyl | H | acetylamino | ethyl | 2-phenylethyl | 587 |
| 270 | n-propyl | H | acetylamino | n-propyl | n-propyl | 589 |
| 271 | n-propyl | H | propionylamino | ethyl | benzyl | 576 |
| 272 | n-propyl | H | H | ethyl | 2-cyanoethyl | 513 |
| 273 | n-propyl | H | acetylamino | 2-cyanoethyl | benzyl | 549 |
| 274 | n-propyl | OCH$_3$ | acetylamino | 2-cyanoethyl | benzyl | 591 |
| 275 | n-propyl | H | H | 2-cyanoethyl | 2-cyanoethyl | 483 |
| 276 | n-propyl | OCH$_3$ | acetylamino | 2-acetoxyethyl | benzyl | 603 |
| 277 | n-propyl | H | H | 2-cyanoethyl | benzyl | 496 |
| 278 | n-propyl | H | acetylamino | 1-methoxycarbonylethyl | methoxycarbonylmethyl | 531 |
| 279 | n-propyl | OCH$_3$ | acetylamino | 1-methoxycarbonylethyl | methoxycarbonylmethyl | 577 |
| 280 | n-propyl | OCH$_3$ | acetylamino | 2-methoxyethyl | 2-methoxyethyl | 600 |
| 281 | n-propyl | H | acetylamino | methoxycarbonylmethyl | methoxycarbonylmethyl | 532 |
| 282 | n-propyl | OCH$_3$ | acetylamino | methoxycarbonylmethyl | benzyl | 595 |
| 283 | n-propyl | H | acetylamino | ethyl | ethoxycarbonylmethyl | 565 |
| 284 | n-propyl | H | acetylamino | ethyl | 2-methoxycarbonylethyl | 578 |
| 285 | n-propyl | H | acetylamino | ethyl | 2-acetoxyethyl | 576 |
| 286 | n-propyl | H | acetylamino | ethyl | 2-hydroxy-3-phenoxypropyl | 584 |
| 287 | n-propyl | H | acetylamino | allyl | allyl | 572 |
| 288 | n-propyl | H | acetylamino | ethyl | 2-ethoxycarbonylethyl | 577 |
| 289 | n-propyl | H | acetylamino | ethyl | 2-hydroxy-3-isopropoxypropyl | 585 |
| 290 | n-propyl | H | methyl | 2-methoxyethyl | 2-methoxyethyl | 547 |
| 291 | n-propy | H | methyl | ethyl | 2-methoxyethyl | 556 |
| 292 | n-propyl | H | H | 2-methoxyethyl | 2-methoxyethyl | 526 |
| 293 | n-propyl | H | trifluoromethyl | 2-methoxyethyl | 2-methoxyethyl | 487 |
| 294 | n-propyl | H | chloro | 2-methoxyethyl | 2-methoxyethyl | 515 |
| 295 | n-propyl | Cl | acetylamino | H | 1-methoxycarbonylethyl | 542 |
| 296 | n-propyl | Cl | acetylamino | H | 1-phenylethyl | 505 |
| 297 | n-propyl | H | H | ethyl | 1-methoxycarbonylethyl | 527 |
| 298 | n-propyl | H | H | ethyl | 2-methoxycarbonylethyl | 507 |
| 299 | n-propyl | H | H | ethyl | methoxycarbonylmethyl | 533 |
| 300 | n-propyl | H | acetylamino | 2-methoxycarbonylethyl | 2-ethoxycarbonylethyl | 535 |
| 301 | n-propyl | CH$_3$ | acetylamino | ethyl | 1-methoxycarbonylethyl | 538 |
| 302 | n-propyl | H | methyl | 2-methoxyethyl | 2-methoxycarbonylethyl | 538 |
| 303 | n-propyl | H | methyl | ethyl | 1-methoxycarbonylethyl | 522 |
| 304 | n-propyl | OCH$_3$ | acetylamino | 2-methoxycarbonylethyl | 2-methoxycarbonylethyl | 605 |
| 305 | n-propyl | H | methyl | ethyl | 1-ethoxycarbonylethyl | 529 |
| 306 | n-propyl | H | H | ethyl | 1-ethoxycarbonylethyl | 512 |
| 307 | n-propyl | H | methoxycarbonyl | 2-methoxyethyl | 2-methoxyethyl | 519 |
| 308 | n-propyl | OCH$_3$ | acetylamino | 2-acetoxyethyl | 2-acetoxyethyl | 600 |
| 309 | n-propyl | OCH$_3$ | acetylamino | benzyl | 1-methoxycarbonylethyl | 587 |
| 310 | n-propyl | OCH$_3$ | acetylamino | methoxycarbonylmethyl | methoxycarbonylmethyl | 576 |
| 311 | n-propyl | H | acetylamino | ethyl | 1-methoxycarbonylethyl | 565 |
| 312 | n-propyl | H | acetylamino | ethyl | 1-ethoxycarbonylethyl | 566 |
| 313 | n-propyl | H | cyano | 2-methoxyethyl | 2-methoxyethyl | 507 |
| 314 | n-propyl | H | acetylamino | H | 1-methoxycarbonylethyl | 547 |
| 315 | n-propyl | H | methyl | ethyl | 2-methoxycarbonylethyl | 546 |
| 316 | n-propyl | OCH$_3$ | acetylamino | H | 1-methoxycarbonylethyl | 594 |
| 317 | n-propyl | H | methyl | 2-cyanoethyl | 2-methoxycarbonylethyl | 512 |
| 318 | n-propyl | H | H | 2-cyanoethyl | 2-methoxycarbonylethyl | 497 |

TABLE 1-continued

Dyestuffs of formula (1a)

(1a)

| Dye | R₁ | R₅ | R₆ | R₇ | R₈ | λmax/nm |
|---|---|---|---|---|---|---|
| 319 | n-propyl | H | acetylamino | 2-cyanoethyl | 2-methoxycarbonylethyl | 553 |
| 320 | n-propyl | H | acetylamino | benzyl | 2-methoxycarbonylethyl | 565 |
| 321 | n-propyl | H | acetylamino | 2-methoxycarbonylethyl | 2-methoxycarbonylethyl | 565 |
| 322 | n-propyl | H | acetylamino | ethyl | 4-nitrobenzyl | 568 |
| 323 | n-propyl | H | acetylamino | n-butyl | n-butyl | 578 |
| 324 | n-propyl | H | acetylamino | ethyl | 4-methoxybenzyl | 580 |
| 325 | n-propyl | H | acetylamino | ethyl | 3-methoxybenzyl | 580 |
| 326 | n-propyl | CH₃ | acetylamino | ethyl | benzyl | 557 |
| 327 | n-propyl | H | acetylamino | n-butyl | benzyl | 580 |
| 328 | n-propyl | CH₃ | acetylamino | ethyl | 2-hydroxy-3-phenoxypropyl | 570 |
| 329 | n-propyl | CH₃ | acetylamino | ethyl | 2-hydroxy-3-isopropoxypropyl | 570 |
| 330 | n-propyl | H | acetylamino | ethyl | n-butyl | 587 |
| 331 | n-propyl | CH₃ | acetylamino | ethyl | 2-phenylethyl | 572 |
| 332 | n-propyl | OCH₃ | acetylamino | allyl | allyl | 617 |
| 333 | n-propyl | H | acetylamino | ethyl | 3-phenoxypropyl | 588 |
| 334 | n-propyl | H | acetylamino | ethyl | n-propyl | 586 |
| 335 | n-propyl | H | acetylamino | ethyl | 4-acetoxybutyl | 586 |
| 336 | n-butyl | H | acetylamino | ethyl | ethyl | 588 |
| 337 | n-butyl | H | acetylamino | ethyl | methyl | 584 |
| 338 | n-butyl | H | acetylamino | ethyl | n-propyl | 590 |
| 339 | n-butyl | H | acetylamino | ethyl | benzyl | 578 |
| 340 | n-butyl | H | acetylamino | ethyl | n-butyl | 592 |
| 341 | n-butyl | H | acetylamino | 2-methoxyethyl | 2-methoxyethyl | 582 |
| 342 | n-butyl | H | acetylamino | ethyl | 2-methoxyethyl | 585 |
| 343 | n-butyl | H | acetylamino | ethyl | 2-cyanoethyl | 571 |
| 344 | n-butyl | H | acetylamino | 2-methoxyethyl | benzyl | 572 |
| 345 | n-butyl | H | methyl | ethyl | benzyl | 546 |
| 346 | n-butyl | OCH₃ | acetylamino | ethyl | 2-cyanoethyl | 603 |
| 347 | n-butyl | H | acetylamino | ethyl | 2-phenylethyl | 585 |
| 348 | n-butyl | H | acetylamino | n-propyl | n-propyl | 587 |
| 349 | n-butyl | H | propionylamino | ethyl | benzyl | 576 |
| 350 | n-butyl | H | H | ethyl | 2-cyanoethyl | 513 |
| 351 | n-butyl | H | acetylamino | 2-cyanoethyl | benzyl | 553 |
| 352 | n-butyl | OCH₃ | acetylamino | 2-cyanoethyl | benzyl | 592 |
| 353 | n-butyl | H | H | 2-cyanoethyl | 2-cyanoethyl | 486 |
| 354 | n-butyl | OCH₃ | acetylamino | 2-acetoxyethyl | benzyl | 603 |
| 355 | n-butyl | H | H | 2-cyanoethyl | benzyl | 498 |
| 356 | n-butyl | H | acetylamino | 1-methoxycarbonylethyl | methoxycarbonylmethyl | 533 |
| 357 | n-butyl | OCH₃ | acetylamino | 1-methoxycarbonylethyl | methoxycarbonylmethyl | 577 |
| 358 | n-butyl | OCH₃ | acetylamino | 2-methoxyethyl | 2-methoxyethyl | 604 |
| 359 | n-butyl | H | acetylamino | methoxycarbonylmethyl | methoxycarbonylmethyl | 532 |
| 360 | n-butyl | OCH₃ | acetylamino | methoxycarbonylmethyl | benzyl | 597 |
| 361 | n-butyl | H | acetylamino | ethyl | ethoxycarbonylmethyl | 565 |
| 362 | n-butyl | H | acetylamino | ethyl | 2-methoxycarbonylethyl | 579 |
| 363 | n-butyl | H | acetylamino | ethyl | 2-acetoxyethyl | 576 |
| 364 | n-butyl | H | acetylamino | ethyl | 2-hydroxy-3-phenoxypropyl | 583 |
| 365 | n-butyl | H | acetylamino | allyl | allyl | 573 |
| 366 | n-butyl | H | acetylamino | ethyl | 2-ethoxycarbonylethyl | 579 |
| 367 | n-butyl | H | acetylamino | ethyl | 2-hydroxy-3-isopropoxypropyl | 585 |
| 368 | n-butyl | H | methyl | 2-methoxyethyl | 2-methoxyethyl | 547 |
| 369 | n-butyl | H | methyl | ethyl | 2-methoxyethyl | 556 |
| 370 | n-butyl | H | H | 2-methoxyethyl | 2-methoxyethyl | 524 |
| 371 | n-butyl | H | trifluoromethyl | 2-methoxyethyl | 2-methoxyethyl | 490 |
| 372 | n-butyl | H | chloro | 2-methoxyethyl | 2-methoxyethyl | 515 |
| 373 | n-butyl | Cl | acetylamino | H | 1-methoxycarbonylethyl | 529 |
| 374 | n-butyl | Cl | acetylamino | H | 1-phenylethyl | 543 |
| 375 | n-butyl | H | H | ethyl | 1-methoxycarbonylethyl | 507 |
| 376 | n-butyl | H | H | ethyl | 2-methoxycarbonylethyl | 530 |
| 377 | n-butyl | H | H | ethyl | methoxycarbonylmethyl | 506 |
| 378 | n-butyl | H | acetylamino | 2-methoxycarbonylethyl | 2-ethoxycarbonylethyl | 532 |
| 379 | n-butyl | CH₃ | acetylamino | ethyl | 1-methoxycarbonylethyl | 537 |
| 380 | n-butyl | H | methyl | 2-methoxyethyl | 2-methoxycarbonylethyl | 540 |

TABLE 1-continued

Dyestuffs of formula (1a)

(1a)

[Structure: phthalimide with Br, azo linkage to aniline with R5, R6, R7, R8 substituents; R1 on imide N; CN on phthalimide ring]

| Dye | R₁ | R₅ | R₆ | R₇ | R₈ | $\lambda_{max}$/nm |
|---|---|---|---|---|---|---|
| 381 | n-butyl | H | methyl | ethyl | 1-methoxycarbonylethyl | 529 |
| 382 | n-butyl | OCH₃ | acetylamino | 2-methoxycarbonylethyl | 2-methoxycarbonylethyl | 607 |
| 383 | n-butyl | H | methyl | ethyl | 1-ethoxycarbonylethyl | 530 |
| 384 | n-butyl | H | H | ethyl | 1-ethoxycarbonylethyl | 515 |
| 385 | n-butyl | H | methoxycarbonyl | 2-methoxyethyl | 2-methoxyethyl | 520 |
| 386 | n-butyl | OCH₃ | acetylamino | 2-acetoxyethyl | 2-acetoxyethyl | 602 |
| 387 | n-butyl | OCH₃ | acetylamino | benzyl | 1-methoxycarbonylethyl | 588 |
| 388 | n-butyl | OCH₃ | acetylamino | methoxycarbonylmethyl | methoxycarbonylmethyl | 576 |
| 389 | n-butyl | H | acetylamino | ethyl | 1-methoxycarbonylethyl | 567 |
| 390 | n-butyl | H | acetylamino | ethyl | 1-ethoxycarbonylethyl | 568 |
| 391 | n-butyl | H | cyano | 2-methoxyethyl | 2-methoxyethyl | 507 |
| 392 | n-butyl | H | acetylamino | H | 1-methoxycarbonylethyl | 549 |
| 393 | n-butyl | H | methyl | ethyl | 2-methoxycarbonylethyl | 547 |
| 394 | n-butyl | OCH₃ | acetylamino | H | 1-methoxycarbonylethyl | 594 |
| 395 | n-butyl | H | methyl | 2-cyanoethyl | 2-methoxycarbonylethyl | 515 |
| 396 | n-butyl | H | H | 2-cyanoethyl | 2-methoxycarbonylethyl | 499 |
| 397 | n-butyl | H | acetylamino | 2-cyanoethyl | 2-methoxycarbonylethyl | 555 |
| 398 | n-butyl | H | acetylamino | benzyl | 2-methoxycarbonylethyl | 566 |
| 399 | n-butyl | H | acetylamino | 2-methoxycarbonylethyl | 2-methoxycarbonylethyl | 565 |
| 400 | n-butyl | H | acetylamino | ethyl | 4-nitrobenzyl | 568 |
| 401 | n-butyl | H | acetylamino | n-butyl | n-butyl | 590 |
| 402 | n-butyl | H | acetylamino | ethyl | 4-methoxybenzyl | 580 |
| 403 | n-butyl | H | acetylamino | ethyl | 3-methoxybenzyl | 580 |
| 404 | n-butyl | CH₃ | acetylamino | ethyl | benzyl | 557 |
| 405 | n-butyl | H | acetylamino | n-butyl | benzyl | 581 |
| 406 | n-butyl | CH₃ | acetylamino | ethyl | 2-hydroxy-3-phenoxypropyl | 572 |
| 407 | n-butyl | CH₃ | acetylamino | ethyl | 2-hydroxy-3-isopropoxypropyl | 570 |
| 408 | n-butyl | H | acetylamino | ethyl | n-butyl | 588 |
| 409 | n-butyl | CH₃ | acetylamino | ethyl | 2-phenylethyl | 575 |
| 410 | n-butyl | OCH₃ | acetylamino | allyl | allyl | 615 |
| 411 | n-butyl | H | acetylamino | ethyl | 3-phenoxypropyl | 586 |
| 412 | n-butyl | H | acetylamino | ethyl | n-propyl | 588 |
| 413 | n-butyl | H | acetylamino | ethyl | 4-acetoxybutyl | 587 |

TABLE 2

| Dye | | $\lambda_{max}$/nm |
|---|---|---|
| 417 | [Structure: N-ethyl phthalimide with Br and CN, azo-linked to 4-(dimethylamino)naphthalene] | 585 |
| 418 | [Structure: N-ethyl phthalimide with Br and CN, azo-linked to 8-hydroxyquinoline] | 480 |

TABLE 2-continued

| Dye | $\lambda_{max}$/nm |
|---|---|
| 419 | 580 |
| 420 | 602 |
| 421 | 610 |
| 422 | 620 |
| 423 | 605 |

TABLE 2-continued

| Dye | | $\lambda_{max}$/nm |
|---|---|---|
| 424 | [structure] | 607 |
| 425 | [structure] | 597 |
| 426 | [structure] | 604 |
| 427 | [structure] | 602 |
| 428 | [structure] | 409 |

TABLE 2-continued
| Dye | | $\lambda_{max}$/nm |
|---|---|---|
| 429 | 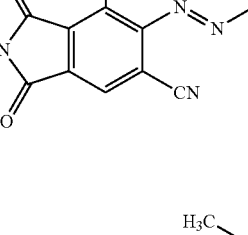 | 410 |
| 430 | 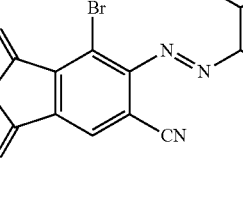 | 411 |
| 431 | 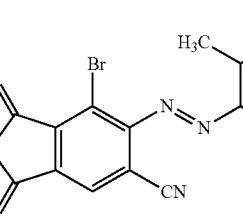 | 411 |
| 432 | 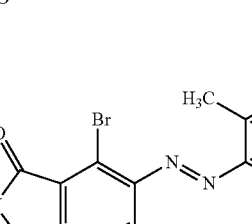 | 412 |
| 433 | 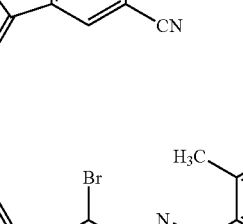 | 413 |
| 434 | 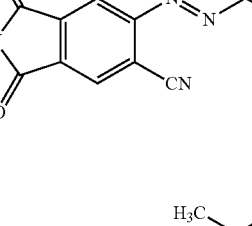 | 411 |

TABLE 2-continued

| Dye | | $\lambda_{max}$/nm |
|---|---|---|
| 435 | [structure] | 411 |
| 436 | [structure] | 428 |
| 437 | [structure] | 435 |
| 438 | [structure] | 435 |
| 439 | [structure] | 446 |
| 440 | [structure] | 590 |

TABLE 2-continued

| Dye | | $\lambda_{max}$/nm |
|---|---|---|
| 441 | (structure) | 594 |
| 442 | (structure) | 598 |
| 443 | (structure) | 593 |
| 444 | (structure) | 587 |
| 445 | (structure) | 570 |

TABLE 2-continued

| Dye | | $\lambda_{max}$/nm |
|---|---|---|
| 446 | (structure) | 572 |
| 447 | (structure) | 555 |
| 448 | (structure) | 556 |
| 449 | (structure) | 532 |
| 450 | (structure) | 533 |
| 451 | (structure) | 552 |

TABLE 2-continued
| Dye | $\lambda_{max}$/nm |
|---|---|
| 452 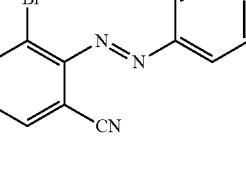 | 552 |
| 453 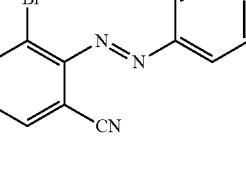 | 594 |
| 454 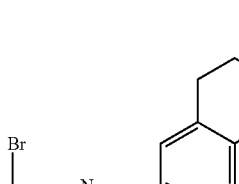 | 580 |
| 455 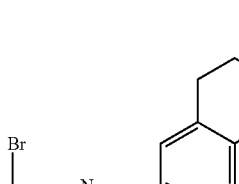 | 554 |
| 456 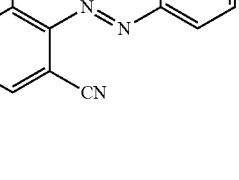 | 528 |

TABLE 2-continued

| Dye | $\lambda_{max}$/nm |
|---|---|
| 457 | 586 |

II. APPLICATION EXAMPLES

II.1: Dyeing of Polyester 1 part by weight of the dye of formula (101) prepared in Example 1.1 is milled together with four parts of a commercially available dispersing agent and 15 parts of water. Using that formulation, a 1% dyeing (based on the dye and the substrate) is produced on woven polyester by high temperature exhaust process at 135° C.

Test results: the light fastness of the dyeing is excellent as well as the results in the AATCC 61 and ISO 105 tests. The build up properties of the dye are very good.

II.2: Dyeing of Polyester

Example II.1 is repeated by using the dyes of formulae (102)-(186) instead of the dye of formula (101). The build up properties of the dyes are very good and the dyeings exhibit good light fastness and very good results in the AATCC 61 and ISO 105 tests.

What is claimed is:

1. A process for the preparation of an azo dye of formula (1)

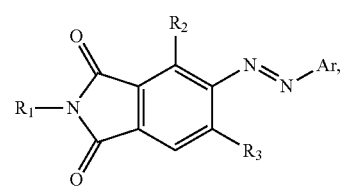

which comprises reacting an azo dye of the formula (3)

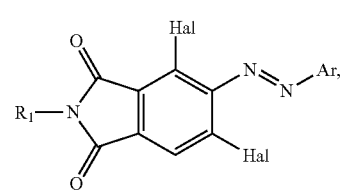

with a mixture of at least one alkali metal cyanide and at least one heavy metal cyanide, wherein $R_1$ denotes a $C_1$-$C_{12}$ alkyl which is unsubstituted or substituted by one or more $C_1$-$C_{12}$ alkoxy groups, $C_1$-$C_{12}$ alkylcarbonyl groups, $C_7$-$C_{25}$ arylcarbonyl groups, hydroxyl groups, amino groups, cyano groups or halogen atoms and which may be interrupted one or more times by the radical —O—, —S—, —NR$_4$—, —COO— or —OOC—;

$R_4$ is hydrogen or $C_1$-$C_{12}$ alkyl;

either $R_7$ is cyano and $R_3$ is halogen or $R_2$ is halogen and $R_3$ is cyano;

Ar represents a carbocyclic or heterocyclic aromatic radical; and

Hal represents halogen and wherein a total amount of 0.5 mol-1.5 mol of cyanide is applied per mol of dye of formula (3).

2. A mixture comprising an azo dye of the formula

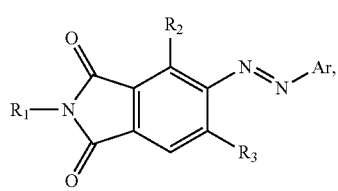

an azo dye of the formula

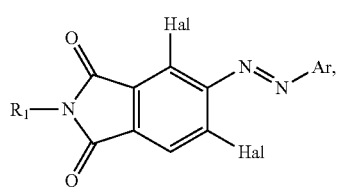

and
an azo dye of the formula

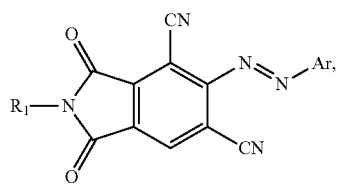

wherein
$R_1$ denotes a $C_1$-$C_{12}$ alkyl which is unsubstituted or substituted by one or more $C_1$-$C_{12}$ alkoxy groups, $C_1$-$C_{12}$ alkylcarbonyl groups, $C_7$-$C_{25}$ arylcarbonyl groups, hydroxyl groups, amino groups, cyano groups or halogen atoms and which may be interrupted one or more times by the radical —O—, —S—, —COO— or —OOC—;

$R_4$ is hydrogen or $C_1$-$C_{12}$ alkyl;

either $R_2$ is cyano and $R_3$ is halogen or $R_2$ is halogen and $R_3$ is cyano;

Ar represents a carbocyclic or heterocyclic aromatic radical;

and Hal represents halogen.

3. A dye mixture comprising
(A) 10-90% by weight, of a dye of the formula (1)

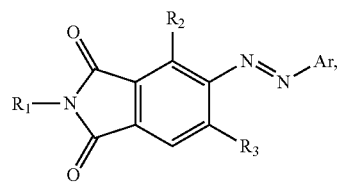

(1)

wherein $R_1$ denotes a $C_1$-$C_{12}$ alkyl which is unsubstituted or substituted by one or more $C_1$-$C_{12}$alkoxy groups, $C_1$-$C_{12}$alkylcarbonyl groups, $C_7$-$C_{25}$arylcarbonyl groups, hydroxyl groups, amino groups, cyano groups or halogen atoms and which may be interrupted one or more times by the radical —O—, —S—, —NR$_4$—, —COO— or —OOC—;

$R_4$ is hydrogen or $C_1$-$C_{12}$ alkyl;

either $R_2$ is cyano and $R_3$ is halogen or $R_2$ is halogen and $R_3$ is cyano; and Ar represents a carbocyclic or heterocyclic aromatic radical and (B) 10-90% by weight, of a dye of the formula (1) as defined above which is structurally different from the dye according to component (A).

4. A process for dyeing or printing semi-synthetic hydrophobic fibre material comprising applying a mixture according to claim 2 to the semi-synthetic hydrophobic fibre material.

5. A semi-synthetic hydrophobic fibre material dyed or printed by the process according to claim 4.

6. A process for dyeing or printing synthetic hydrophobic fibre material comprising applying a mixture according to claim 2 to the synthetic hydrophobic fibre material.

7. A synthetic hydrophobic fibre material dyed or printed by the process according to claim 6.

8. A process for dyeing or printing semi-synthetic hydrophobic fibre material comprising applying the dye mixture according to claim 3 to the semi-synthetic hydrophobic fibre material.

9. A semi-synthetic hydrophobic fibre material dyed or printed by the process according to claim 8.

10. A process for dyeing or printing synthetic hydrophobic fibre material comprising applying the dye mixture according to claim 3 to the synthetic hydrophobic fibre material.

11. A synthetic hydrophobic fibre material dyed or printed by the process according to claim 10.

* * * * *